United States Patent [19]

Masuda

[11] Patent Number: 4,706,182

[45] Date of Patent: Nov. 10, 1987

[54] RF HIGH-VOLTAGE POWER SUPPLY

[76] Inventor: Senichi Masuda, 3-2-1-415, Nishigahara, Kita-ku, Tokyo, Japan

[21] Appl. No.: 947,814

[22] Filed: Dec. 30, 1986

[30] Foreign Application Priority Data

Jan. 10, 1986 [JP] Japan ................................ 61-3040

[51] Int. Cl.$^4$ ......................................... H02M 7/519
[52] U.S. Cl. ................................ 363/139; 422/186.16
[58] Field of Search .................... 363/24, 28, 133, 134, 363/139; 422/186.15, 186.16; 204/176

[56] References Cited

U.S. PATENT DOCUMENTS 3,496,092  2/1970  Fraser .............................. 422/186.16
4,051,043  9/1977  Harter et al. ..................... 422/186.16
4,250,541  2/1981  Chang et al. ......................... 363/139

*Primary Examiner*—Patrick R. Salce
*Assistant Examiner*—Judson H. Jones
*Attorney, Agent, or Firm*—Price, Heneveld, Cooper, DeWitt & Litton

[57] ABSTRACT

There is disclosed a small-sized RF high-voltage power supply capable of stably supplying an RF high voltage to a load at the maximum power efficiency, even if the load has a nonlinear electrostatic capacity that varies with the applied voltage. The power supply has an RF step-up transformer equipped with a primary winding having a tap to which one end of a power capacitor is connected. An oscillating inductor, a thyristor, and the other end of the power capacitor are connected in series with each end of the primary winding in this order. Each thyristor conducts when a voltage is applied to it from the corresponding end of the primary winding. A diode is connected in antiparallel with each thyristor. The thyristors are alternately triggered to conducting state.

14 Claims, 3 Drawing Figures

4,706,182

RF HIGH-VOLTAGE POWER SUPPLY

BACKGROUND OF THE INVENTION

1. Field of the Invention

The present invention relates to a power supply for efficiently and stably supplying a radio-frequency, high voltage to a nonlinear capacitive load whose electrostatic capacity varies with the applied voltage, such as an ozonizer making use of a creeping discharge.

2. Description of the Prior Art

Heretofore, a combination of a radio-frequency oscillator and a radio-frequency step-up transformer has been used as a power supply of this kind. In this arrangement, the electrostatic capacity of the load varies with the AC voltage within one period of the voltage because of electric discharge or other phenomenon. Therefore, it is impossible to compensate for the reactive power, by the use of a series or parallel inductance. For this reason, the RF oscillator and the step-up transformer have been bulky and expensive. Further, a large amount of loss occurs, greatly lowering the power efficiency. In addition, when the voltage exceeds a certain threshold value, the electric current jumps to an excessive value, which is an unstable phenomenon intrinsic in a nonlinear circuit. Therefore, it is difficult to drive them stably.

SUMMARY OF THE INVENTION

In view of the foregoing problems with the prior art RF high-voltage power supply, it is an object of the present invention to provide an RF high-voltage power supply which is small in size but capable of supplying an RF high voltage to a load stably and at the maximum efficiency at all times, even if the electrostatic capacity of the load is of a nonlinear type and varies with the applied voltage.

The above object is achieved in accordance with the teachings of the invention by an RF high-voltage power supply comprising: an RF step-up transformer having a primary winding that receives a lower voltage and has a tap, the transformer further having a secondary winding that delivers a higher voltage between its both output terminals; a power capacitor connected with a charging DC power supply and having one end connected to the tap of the primary winding and the other end connected with both ends of the primary winding; a first antiparallel combination of an oscillating inductor and an appropriate, externally controlled switching device, such as a silicon controlled rectifier or thyristor, that conducts when the capacitor discharges, one end of the primary winding being connected in series with the first combination; a second antiparallel combination of an oscillating inductor and an appropriate, externally controlled switching device, such as a silicon controlled rectifier or thyristor, that conducts when the capacitor discharges, the other end of the primary winding being connected in series with the second combination; and a control power supply for supplying control signals alternately to the control terminals of the externally controlled switching devices to alternately bring the switching devices into conduction.

The externally controlled switching device referred to herein means any device which, when no control signal is fed to its control terminal, is maintained in its blocking state and which, when a control signal is applied to it, permits an electric current to flow from the anode terminal to the cathode terminal.

Other objects and features of the invention will appear in the course of the description thereof which follows.

PREFERRED EMBODIMENTS OF THE INVENTION

Figure 1:
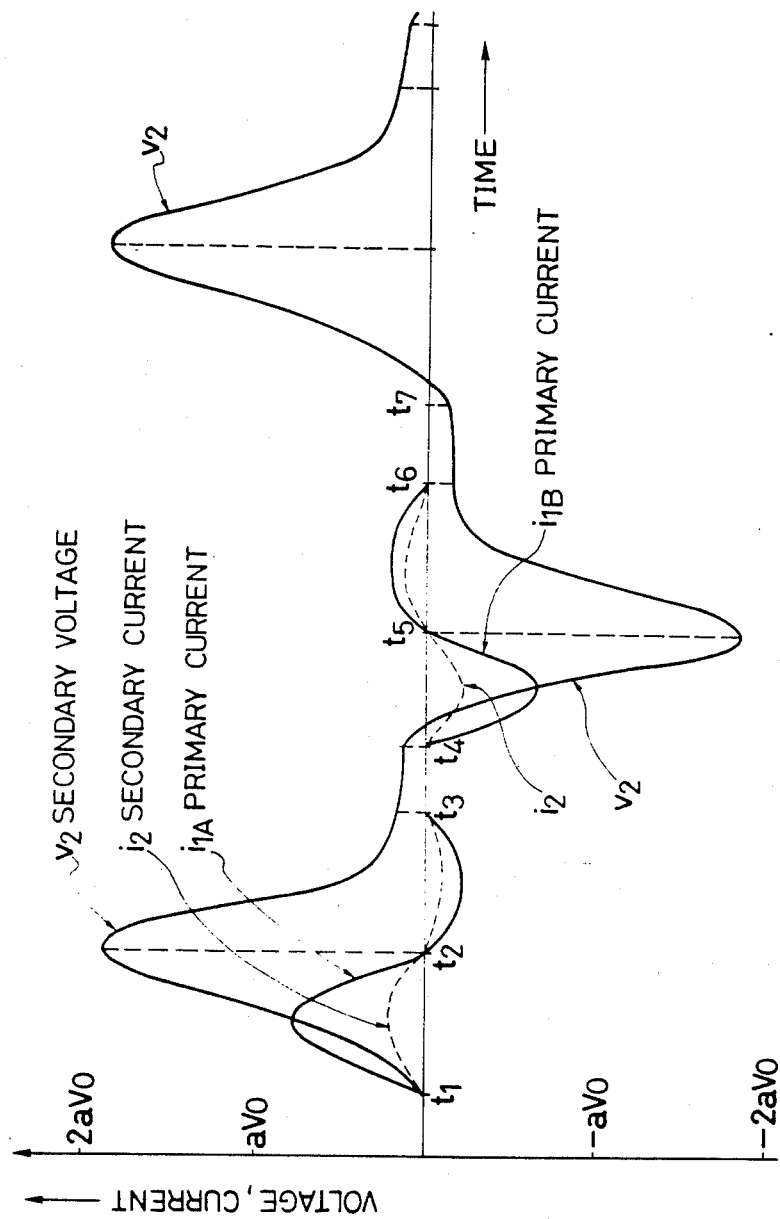
FIG. 1 is a diagram showing the waveforms of the output voltage and the output current from a power supply according to the invention, as well as the waveform of the electric current flowing through the primary side of the step-up transformer of the power supply.
Figure 2:
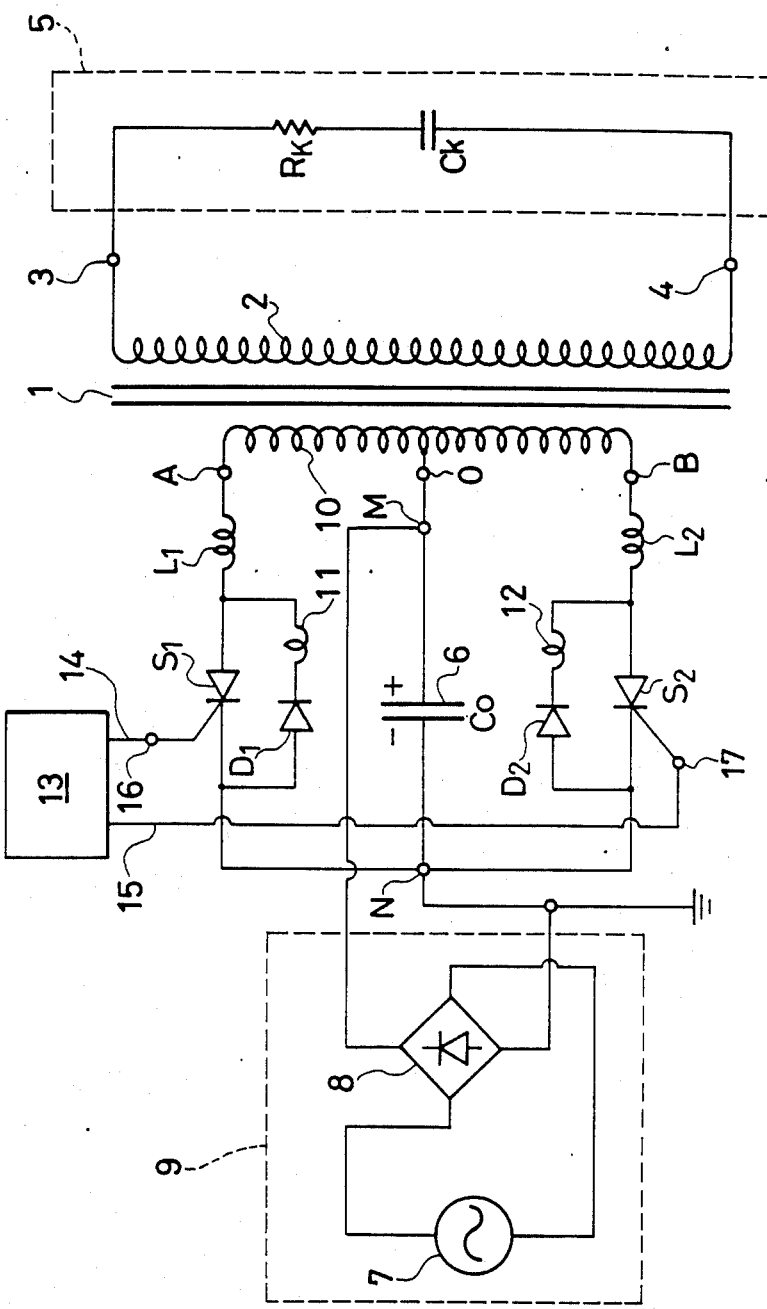
FIG. 2 is a circuit diagram of the power supply according to the invention, the power supply delivering output current and voltage having the waveforms as shown in FIG. 1.

Referring to FIG. 2, there is shown a power supply according to the present invention. This power supply has an RF step-up transformer 1 equipped with a second winding 2 which has output terminals 3 and 4. A capacitive load 5 consisting of a small resistance $R_k$ and a comparatively large nonlinear capacitance $C_k$ is connected between the output terminals 3 and 4. The equivalent capacitance on the primary side of the load 5 is given by $a^2 C_k$. A power capacitor 6 has an electrostatic capacity $C_0$ sufficiently larger than $a^2 C_k$. A charging DC power supply 9 consisting of a low-frequency AC power supply 7 and a full-wave rectifier 8 is connected between both terminals M and N of the capacitor 6. This capacitor 6 is electrically charged so that a voltage $V_0$ is developed between the positive terminal M and the negative terminal N that is grounded. The terminal M is connected to a tap O on the primary winding 10 of the step-up transformer 1. The primary winding 10 has terminals A and B which are connected with the terminal N and grounded via oscillating inductors $L_1$ and $L_2$ and also via externally controlled switching devices $S_1$ and $S_2$, respectively. The switching devices $S_1$ and $S_2$ are connected in series with the inductors $L_1$ and $L_2$, respectively, in the forward direction, i.e., in the direction in which the capacitor 6 discharges. Each of the switching devices $S_1$ and $S_2$ consists of a silicon controlled rectifier. Diodes $D_1$ and $D_2$ are connected in antiparallel with the switching devices $S_1$ and $S_2$, respectively. Small inductances 11 and 12 are connected in series with the diodes $D_1$ and $D_2$, respectively. When electric currents flowing through the diodes $D_1$ and $D_2$ are reversed in direction, a small voltage drop is produced between both ends of each of the switching devices $S_1$ and $S_2$. Thus, it is assured that the switching devices are restored to their blocking state. A control power supply 13 supplies control currents alternately to control terminals 16 and 17 of the switching devices $S_1$ and $S_2$ via lead wires 14 and 15, respectively, so that the devices $S_1$ and $S_2$ may conduct alternately. As a result, electric currents $i_1 A$ and $i_1 B$ shown in FIG. 1 alternately flow through a path M-O-A-N including the device $S_1$ and a path M-O-B-N including the device $S_2$. An RF high voltage $v_2$ shown in FIG. 1 is applied between both terminals 3 and 4 of the capacitive load 5.

In the novel power supply, the silicon controlled rectifiers which are used as the externally controlled switches can be replaced with power transistors, field-effect transistors, triacs, GTOs (gate turnoffs), or the like. Also, a combination of a three-phase or polyphase, low-voltage AC power supply and a three-phase or polyphase diode bridge can be employed as the AC power supply 9.

When the control terminal of the externally controlled switching device $S_1$ receives a control signal, the device immediately comes into conduction. Therefore, a portion of the voltage $V_0$ developed across the power capacitor flows through one end M of the capacitor, the tap O of the primary winding of the step-up transformer, the terminal A of the primary winding, the oscillating inductance $L_1$, the device $S_1$ that is conducting, and the other end N of the capacitor, and is discharged. At this time, an electromotive force is induced across the secondary winding of the step-up transformer. This force is applied between both ends of the aforementioned nonlinear capacitive load. The voltage and the current flowing on the primary and secondary sides cause transient oscillation through series circuits each including the electrostatic capacity $C_0$ of the power capacitor, the inductance $l_0$ of the oscillating inductor, the leakage impedance $Z_1$ on the primary side of the step-up transformer or the leakage impedance $Z_2$ on the secondary side, the electrostatic capacity $C_k$ and the resistance $R_k$ of the capacitive load. When the relation $C_0 >> a^2 C_k$ (a is the ratio of the number of turns of the secondary winding to the number of turns of the primary winding) holds, $C_k$ is once charged to a value close to $2aV_0$ by the transient oscillation. Then, $C_k$ is discharged through the secondary winding, producing an electromotive force greater than $V_0$ between the tap O of the primary winding and the terminal A in the reverse direction, i.e., in the direction to electrically recharge the power capacitor. As a result, a reverse voltage is applied to the externally controlled switching device $S_1$, whereby it is restored to its blocking state. However, the diode connected in antiparallel with the device $S_1$ comes into conduction and so the transient oscillation persists. That is, a reverse current flows through the other end N of the power capacitor, the diode $D_1$, the oscillating inductor $L_1$, the terminal A of the primary winding of the step-up transformer, the tap O of the primary winding, and one end M of the capacitor. The reactive power which charged the capacitor $C_0$ and was supplied to $C_k$ of the load is returned to $C_0$.

During this process, the voltage $v_2$ and the current $i_2$ developed between the capacitive load vary with time, as shown in FIG. 1, from instant $t_1$ to instant $t_3$. The voltage $v_2$ is indicated by a solid line. The current $i_2$ is indicated by a broken like. The instants $t_1$ and $t_2$ are the times when the switching device is turned on and off, respectively. The instant $t_3$ is the time when the electric discharge due to the transient oscillation ends. After the instant $t_3$, $C_k$ slowly discharges. During this interval, the primary current $i_1A$ changes as indicated by a solid line. During the period between $t_1$ and $t_2$, the current flows through M, O, A, $L_1$, $S_1$, and N. During the period between $t_2$ and $t_3$, the current flows through N, $D_1$, $L_1$, A, O, and M. It is now assumed that a control signal is furnished to one externally controlled switching device $S_2$ at instant $t_4$, bringing the device into conduction. Then, exactly the same transient oscillation as the foregoing takes place through M, O, the terminal B of the primary winding on the side of the switching device $S_2$, the oscillating inductor $L_2$ on the side of the device $S_2$, $S_2$, and N and also through N, the diode $D_2$ connected in antiparallel with $S_2$, $L_2$, B, O, and M. The current flowing through the secondary winding of the step-up transformer, the voltage $v_2$ produced across the capacitive load connected to the winding, and the current $i_2$ flowing through the load are reversed in direction. This process is indicated by a solid line as shown in FIG. 1 and persists during the period between $t_4$ and $t_6$. During this period, the primary current $i_1B$ varies as indicated by a broken line. Thereafter, the switching device $S_1$ is again triggered into its conducting state. Subsequently, these processes are repeated. Thus, an RF high voltage is applied to the capacitive load with the period $T_0$ that is equal to the interval between $t_1$ and $t_7$.

Generally, when a selection is made to give the relationship $C_0 >> a^2 C_k$, $v_2$ can be preferably increased further. When the resistances of the primary and secondary windings and the resistance $R_k$ of the load are small enough to be negligible, the period of the transient oscillation during the period between $t_1$ and $t_3$ and the inductance are approximately given by $$T = 2\pi \sqrt{LC_k'} \qquad (1)$$

$$L = l_0 + l_1 + l_2' \qquad (2)$$

where $l_1$ is the leakage inductance of the portion OA or OB of the primary winding, $l_2'$ is the equivalent value on the primary side of the leakage inductance $l_2$ of the secondary winding and equals $l_2/a^2$, $C_k'$ is the equivalent value on the primary side of $C_k' = C_k$ and equals $a^2 C_k$. Accordingly, in the present power supply, the time interval $\theta (= t_4 - t_1)$ at which the control signals are supplied to the devices $S_1$ and $S_2$ is generally required to satisfy the relation $$\theta \geq T$$

where T is the period of the transient oscillation and given by formula (1). Therefore, the effective period $T_0$ $(= t_7 - t_1)$ of the AC high voltage delivered from the power supply is composed of positive and negative half waves and must fulfill the requirement $$T_0 \geq 2T$$

The AC high voltage delivered from the novel power supply is composed of independent positive and negative half waves each of which consists of an LC transient oscillation which is a kind of free oscillation. Although the circuit has the nonlinear element $C_k$, it operates at an improved efficiency while resonating. The reactive power supplied to $C_k$ of the capacitive load during the former period between $t_1$ and $t_2$ or between $t_4$ and $t_5$ of each oscillation is returned to the power capacitor $C_0$ most effectively. Hence, the power efficiency is quite high. Also, the load voltage $v_2$ rises almost to $2aV_0$ rather than simply to $aV_0$ because of LC oscillation. This necessarily increases the voltage further. The required devices and components are small as compared with the obtained voltage and, therefore, the power supply is economical. Another advantage arises from the fact that each half wave is a free oscillation due to a DC step voltage rather than an oscillation forced by alternating electromotive force. Specifically, any unstable phenomenon such as abrupt jumps of the output voltage does not take place, though the nonlinear element $C_k$ is included. The power supply always operates stably even if the output voltage is increased.

Figure 3:
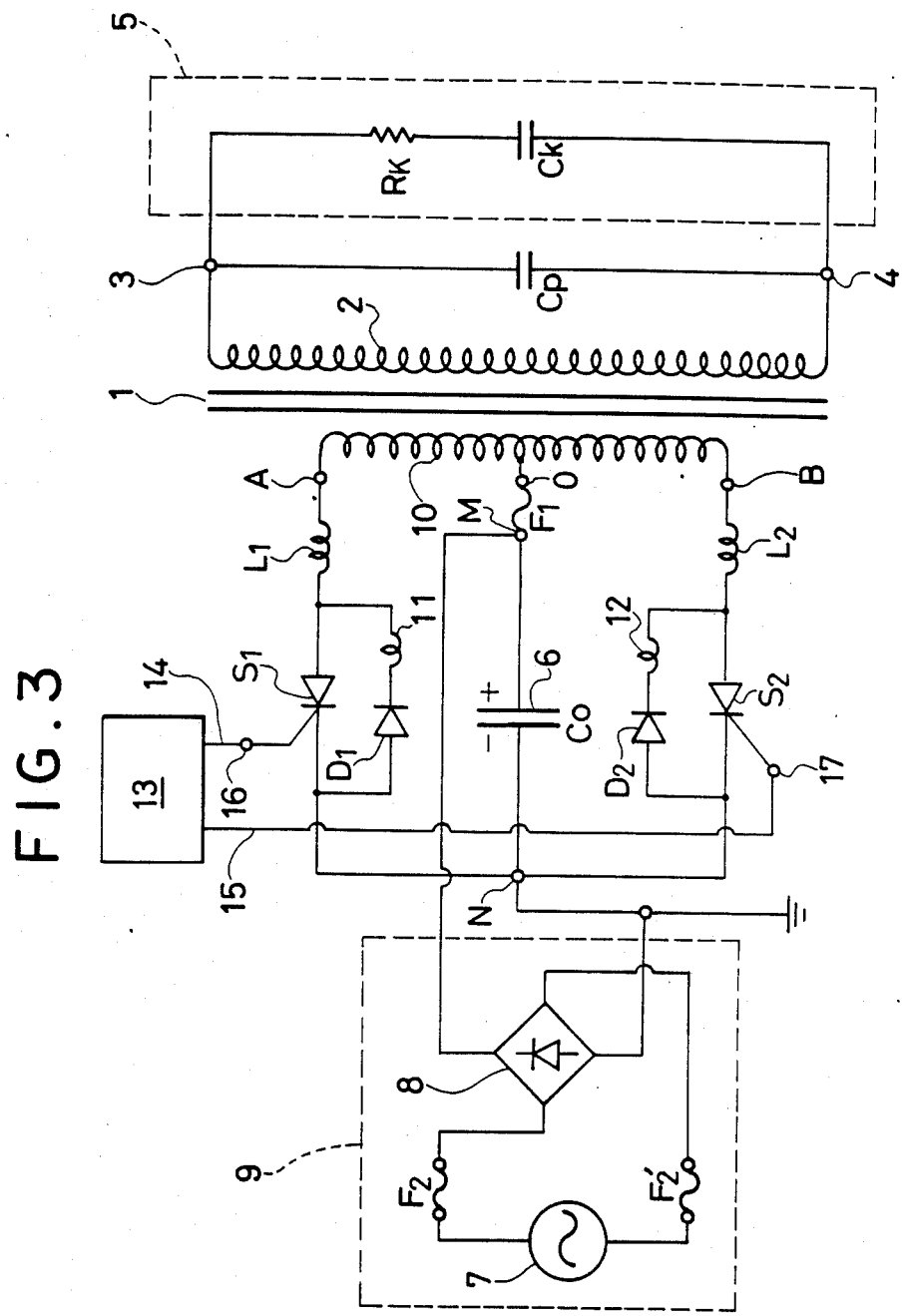
FIG. 3 is a circuit diagram of another power supply according to the invention.

The case in which the load 5 is disconnected from the output terminal 3 or 4 because of an accident, thus opening both ends of the output terminal 3 or 4, and the case in which the output terminals 3 and 4 are short-circuited for some reason or other should be considered most seriously in practicing the invention. In the former case, the transient oscillation illustrated in FIG. 1 does not occur. Under this condition, either the switching device $S_1$ or $S_2$ or both are maintained in conduction. A short-circuit current flows from the power supply, burning out these devices and the rectifier 8. In order to prevent such an accident, it is necessary that the power supply include a protective capacitor $C_p$ whose electrostatic capacity is at least a fraction of $C_k$, the capacitor $C_p$ being connected between both ends of the output terminals 3 and 4, as shown in FIG. 3. In this example, $C_k$ included in $C_k'=a^2C_k$ given by formula (1) should be replaced by $C_k+C_p$. In the latter case, the transient oscillation stops. Further, short-circuit current flow into the primary and secondary windings of the step-up transformer, burning out them. Additionally, the switches $S_1$, $S_2$, and the rectifier 8 are burned out. In order to protect these devices, it is necessary to insert a fuse $F_1$ between the terminal M and the tap O, a fuse $F_2$ between one terminal of the AC low-voltage power supply 7 and one terminal of the rectifier 8, and a fuse $F_2'$ between the other terminal of the power supply 7 and another terminal of the rectifier 8, as shown in FIG. 3.

What is claimed is:

1. An RF high-voltage power supply comprising:
   an RF step-up transformer having a primary winding that receives a lower voltage and has a tap, the transformer further having a secondary winding that delivers a higher voltage between its both output terminals;
   a power capacitor connected with a charging DC power supply and having one end connected to the tap of the primary winding and the other end connected with both ends of the primary winding;
   a first series combination of an oscillating inductor and anti-parallel combination of an externally controlled switching device that conducts when the capacitor discharges and a diode, one end of the primary winding being connected in series with the first combination;
   a second series combination of an oscillating inductor and anti-parallel combination of an externally controlled switching device that conducts when the capacitor discharges and a diode, the other end of the primary winding being connected in series with the second combination; and
   a control power supply for supplying control signals alternately to the control terminals of the externally controlled switching devices to alternately bring the switching devices into conduction.

2. The RF high-voltage power supply of claim 1, wherein a protective capacitor is connected between the output terminals of the secondary winding.

3. The RF high-voltage power supply of claim 1 or 2, wherein a fuse is inserted between the tap of the primary winding and one end of the power capacitor.

4. The RF high-voltage power supply as claimed in claim 1, wherein each of the externally controlled switching devices is a silicon controlled rectifier or thyristor.

5. The RF high-voltage power supply as claimed in claim 1, wherein each of the externally controlled switching devices is a field-effect transistor.

6. The RF high-voltage power supply as claimed in claim 1, wherein a small amount of inductance is connected in series with the diode of each antiparallel combination.

7. The RF high-voltage power supply as claimed in claim 2, wherein each of the externally controlled switching devices is a silicon controllled rectifier or thyristor.

8. The RF high-voltage power supply as claimed in claim 3, wherein each of the externally controlled switching devices is a silicon controlled rectifier or thyristor.

9. The RF high-voltage power supply as claimed in claim 2, wherein each of the externally controlled switching devices is a field-effect transistor.

10. The RF high-voltage power supply as claimed in claim 3, wherein each of the externally controlled switching devices is a field-effect transistor.

11. The RF high-voltage power supply as claimed in claim 2, wherein a small amount of inductance is connected in series with the diode of each antiparallel combination.

12. The RF high-voltage power supply as claimed in claim 3, wherein a small amount of inductance is connected in series with the diode of each antiparallel combination.

13. The RF high-voltage power supply as claimed in claim 4, wherein a small amount of inductance is connected in series with the diode of each antiparallel combination.

14. The RF high-voltage power supply as claimed in claim 5, wherein a small amount of inductance is connected in series with the diode of each antiparallel combination.

* * * * *

UNITED STATES PATENT AND TRADEMARK OFFICE
CERTIFICATE OF CORRECTION

PATENT NO. : 4,706,182

DATED : November 10, 1987

INVENTOR(S) : Senichi Masuda

It is certified that error appears in the above-identified patent and that said Letters Patent is hereby corrected as shown below:

Column 3, line 23:
 "$1_0$" should be --$\ell_0$--
Column 3, line 52:
 "like" should be --line--
Column 4, line 28:
 "$1_0$" should be --$\ell_0$--
Column 4, line 29:
 "$1_2'$" should be --$\ell_2'$--
Column 4, line 30:
 "$1_2$" should be --$\ell_2$--
Column 4, line 31:
 "$1_2/a^2$," should be --$\ell_2/a^2$,--
Column 6, line 26:
 "controllled" should be --controlled--

Signed and Sealed this

Twenty-fourth Day of January, 1989

*Attest:*

DONALD J. QUIGG

*Attesting Officer*    *Commissioner of Patents and Trademarks*